US005930883A

United States Patent [19]

McWhirt et al.

[11] Patent Number: 5,930,883

[45] Date of Patent: Aug. 3, 1999

[54] CABINET SYSTEM AND METHOD FOR MANUFACTURING CABINETS

[75] Inventors: R. Scott McWhirt, Huntingburg; Jay M. Henriott, Jasper, both of Ind.

[73] Assignee: Kimball International, Inc., Jasper, Ind.

[21] Appl. No.: 08/904,286

[22] Filed: Jul. 31, 1997

[51] Int. Cl.[6] ........ B23P 11/00

[52] U.S. Cl. ........ 29/434; 16/235; 312/257.1

[58] Field of Search ........ 29/434; 16/235; 312/204, 257.1, 109, 325

[56] References Cited

U.S. PATENT DOCUMENTS

| | | | |
|---|---|---|---|
| Re. 30,717 | 8/1981 | Dargene | 16/235 |
| 3,590,419 | 7/1971 | Dargene | 16/235 |
| 4,058,333 | 11/1977 | Roe et al. | 292/172 |
| 4,760,623 | 8/1988 | Toyama | 16/238 |
| 4,894,884 | 1/1990 | Lautenschlager | 16/278 |
| 5,103,532 | 4/1992 | Youngdale | 16/288 |

OTHER PUBLICATIONS

Hafele Metallamat Hinge Brochure.
Salice Catalog, Jun. 1994.
Salice Face Frame—Series 500 Brochure.
Salice Nuovo Rapido Brochure.
Salice Furniture Hinges Brochure.

*Primary Examiner*—S. Thomas Hughes
*Attorney, Agent, or Firm*—Baker & Daniels

[57] ABSTRACT

The present invention provides a cabinet system and a method of manufacturing cabinets which allows the use of identically machined door and side panels to produce cabinets in either the inset or the overlay configuration. In the inset configuration, the exterior surface of the door is flush with the end surface of the side panel. In the overlay configuration, the door lies on top of the end of the side panel. By using hinge mechanisms which have either a substantially straight housing or an offset portion, door and side panels having identical bore configurations can be used to produce either inset or overlay style cabinets. Spacers may be used with the hinge mechanisms to produce half and full inset or overlay configurations.

7 Claims, 7 Drawing Sheets

CABINET SYSTEM AND METHOD FOR MANUFACTURING CABINETS

BACKGROUND OF THE INVENTION

1. Field of the Invention

The present invention relates generally to a cabinet system and more particularly to a cabinet system constructed using standardized components.

2. Description of the Related Art

Cabinets may be constructed in either the inset or the overlay configuration. In the inset configuration, the door end adjacent the side panel lies on the interior side of the side panel. When the door is opened, the hinge mechanism connecting the door with the side panel allows the door end to swing and rotate outwardly from the side panel such that the door is substantially parallel to the side panel in the fully opened position.

In the overlay configuration, the door end adjacent the side panel lies adjacent the side panel. Again, the hinge mechanism connecting the door to the side panel allows the door end to swing and rotate outwardly from the end of the side door during opening such that the door is substantially parallel to the side panel in the fully open position.

Producing cabinets having either the inset or the overlay configuration requires the use of differently machined door panels and side panels, i.e. panels with different bore configurations. A plurality of bores are machined onto the side panels for accepting mounting screws to attach the hinge mechanism to the side panels. The setback distance, which is the distance between the bores and the edge of the side panel depends on the desired configuration. Generally, the bores associated with the inset configuration are required to be further away from the end of the side panel than the bores used for the overlay configuration. This difference in set back distance requires different bore configurations for the panels used in the two types of cabinets.

Additionally, a large diameter bore, i.e. a hinge cup, is required to be machined onto the door panel for accepting the recessed portion of the hinge mechanism. Again, the location of the hinge cup varies depending on whether the inset or the overlay configuration is desired. In particular, the tab distance, which is the distance between the edge of the bore and the hinge of the door panel, depends on the desired configuration.

The requirement of differently machined door panels and side panels for different configurations increases the time, effort and equipment necessary to produce the desired cabinet style. The additional time, effort and equipment leads to reduced efficiency as well as to increased cost due to the additional considerations. Further, the requirement of differently bored door and side panels requires the cabinet manufacturer to keep a sufficient inventory of the differently bored door and side panels on hand. This requires the manufacturer to track the inventory to insure that there is neither a surplus nor a shortage of the required parts and also to insure that sufficient storage space is available to keep adequate numbers of the differently bored panels available. These additional considerations again reduce efficiency and raise costs.

Therefore, what is needed is a cabinet system and a method for manufacturing cabinets which utilize standard, identically bored panels to form various cabinet configurations.

SUMMARY OF THE INVENTION

The present invention provides a cabinet system and a method for manufacturing cabinets in either the inset or overlay configuration using identically bored door panels and identically bored side panels. Each cabinet type may also be of a full or half configuration. Identically bored door panels and identically bored side panels may be used by employing hinge mechanisms having a body portion configured for use in either the inset cabinet or the overlay cabinet. The hinge mechanism used in the overlay cabinet includes a housing which extends in a substantially straight manner since no offset is required in the overlay configuration. On the other hand, the hinge mechanism used in the inset configuration includes an inclined housing portion which interconnects two housing portions which are offset with respect to each other to compensate for the different relationship between the ends of the side panel and the door panel in the inset configuration. The use of either hinge mechanisms having a generally straight housing or hinge mechanisms having an inclined portion interconnecting two offset housing portions allows either the inset or overlay configurations to be constructed using identically bored door panels and identically bored side panels. Additionally, the side panels used in the present invention are symmetrical so that any side panel could be used for either side of the cabinet. A spacer may be included to produce a half or full configuration.

In one form thereof, the present invention provides for a cabinet system and a method of manufacturing cabinets using an overlay hinge, an offset hinge, cabinet side panels having pre-drilled bores disposed about 37 millimeters from the end of the side panel with a distance of about 32 millimeters between each bore, and door panels having a hinge cup edge disposed about 3 millimeters from the edge of the door panel.

Therefore, an object of the present invention is to provide a cabinet system and a method for manufacturing cabinets, in either the inset or the overlay configuration, using identically bored side panels and identically bored door panels. The particular cabinet style is produced using an inset hinge mechanism or an overlay hinge mechanism. The use of standard door panels and side panels allows the manufacturer to increase efficiency and reduce costs obviating the need for differently bored panels for different configurations.

These and other objects and all of the features of the present invention will become more apparent in the following description when taken in conjunction with the accompanying drawings.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
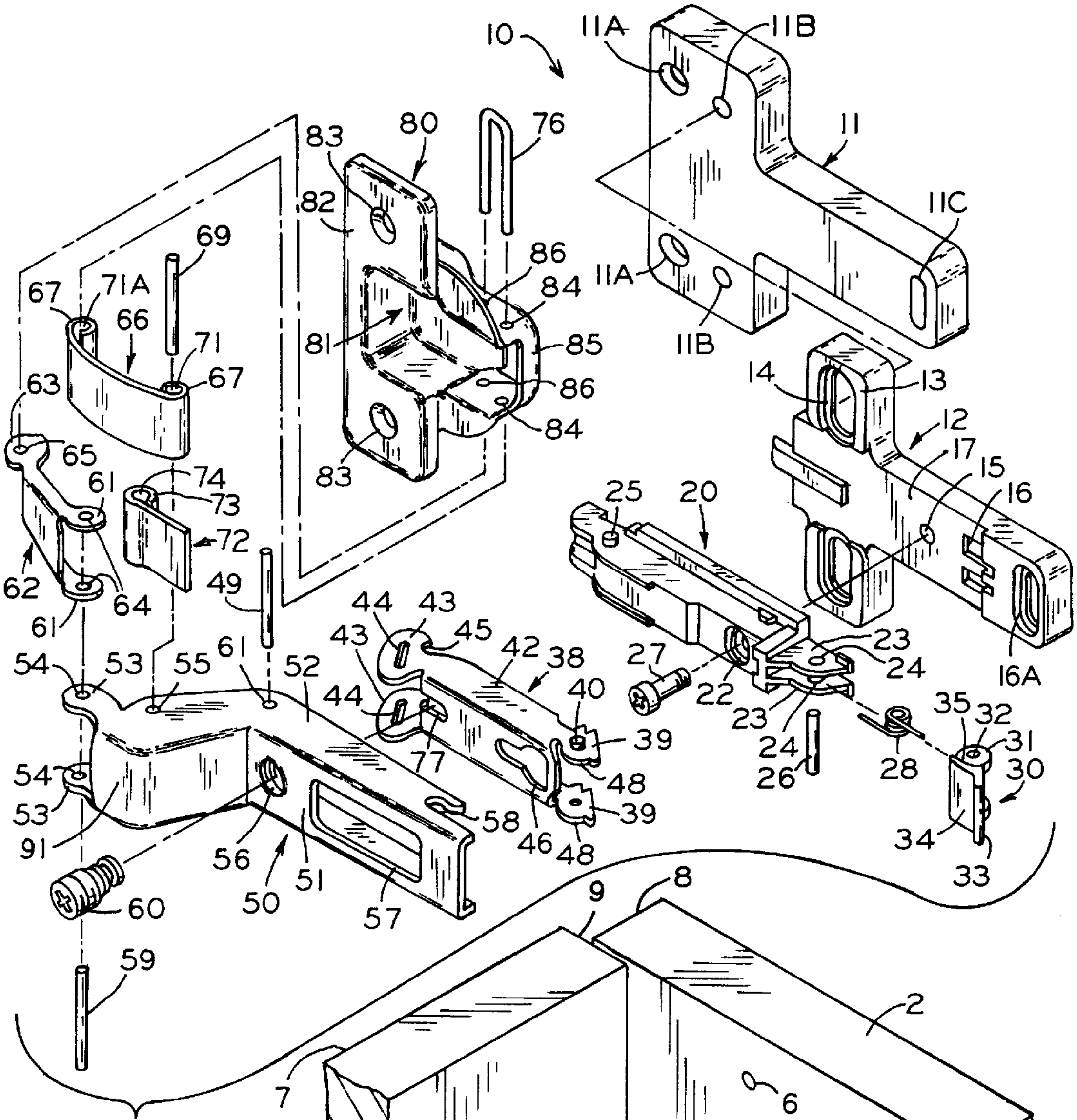
FIG. 1 is an exploded view of an inset hinge used in the present invention.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather, the embodiment is chosen and described so that others skilled in the art may utilize its teachings.

The present invention provides a cabinet system and a method for manufacturing cabinets using identically bored door panels and identically bored side panels in a production environment. The method comprises the steps of providing a plurality of identically bored door panels, a plurality of cabinets having identically bored side panels, a plurality of inset hinges adapted for use in a half or full inset configuration and a plurality of overlay hinges adapted for use in a half or full overlay configuration.

When it is desired to produce a particular inset cabinet, an appropriate number of door panels and cabinets are selected from the inventory of identically bored door panels and the inventory of identically bored cabinets. Also, the desired number of inset hinges are selected from the inventory of inset hinges. Spacers are selected as desired. The selected components are then assembled to produce an inset cabinet.

When it is desired to produce a particular overlay cabinet, an appropriate number of door panels and cabinets are selected from the inventory of identically bored door panels and the inventory of identically bored cabinets. Also, the desired number of overlay hinges are selected from the inventory of overlay hinges. Spacers are selected as desired. The selected components are then assembled to produce an overlay cabinet. By maintaining an inventory and selecting the of the components as required, it is possible to easily produce both inset and overlay cabinets using standard components in a production environment.

The various components used in the cabinet system and method for manufacturing cabinets will be described first followed by a description of the method of manufacturing cabinets using the components described herein.

Referring to FIG. 1, inset hinge 10, which is commercially available from Salice America of Charlotte, N.C., under part Nos. C2R7G99 (hinge) and BAVGE09/F (mounting plate) comprises housing 50, connected to side panel mounting plate 12 and rotatably connected to door panel mounting member 80. Cover 38 is connected to housing 50 and detachably coupled to body member 20 which is fixedly attached to side mounting plate 12. Housing 50 is rotatably connected to door panel mounting member 80 via link segments 62, 66 and 72.

Side panel mounting plate 12 is generally T-shaped and comprises elongate portion 17 and transversely disposed fitting portion 13. Each end of fitting portion 13 has opening 14 which accepts mounting screw 100 for fixedly attaching side panel mounting plate 12 onto side panel 2. Side panel mounting plate 12 also includes opening 15 which accepts screw 27 for fixedly attaching body 20 to side panel mounting plate 12. Further, a pair of grooves 16 are disposed on one end of door mounting plate 12 to engage hubs 31 of release 30 and allow hubs 31 to rotate inside grooves 16. Optionally, spacer 11 may be placed between mounting plate 12 and the side panel. Spacer 11 includes openings 11A and 11B for accepting mounting screw 100 and opening 11C which aligns with opening 16A. Spacer 11 preferably has a depth of about 13 mm. Spacer 11 allows inset hinge 10 to be used to produce a full inset cabinet, i.e. a cabinet in which the edge of the side panel is flush with the exterior of the door panel.

Body 20 is fixedly attached to side mounting plate 12 by screw 27 which extends through opening 22 into engagement with opening 15. Stubs 25 are disposed on the sides of one end of body 20 to engage hooked portions 45 of cover 38. Release 30 rotatably engages forwardly extending flange portions 23 of body 20 via shaft 26 which passes through openings 24 of forwardly extending flange portions 23 and openings 32 of hubs 31. Thus, release 30 is rotatably connected with forwardly extending flange portions 23 to rotate about the axis of shaft 26. Spring 28 is disposed between forwardly extending flange portions 23, body 20 and release 30 to bias release 30 into an upright position wherein top surface 34 is substantially parallel to the top surface of body member 20. Release 30 includes ridge 33 whereat a user may apply downward pressure to rotate release 30 about the axis of shaft 26. As described further below, rotating release 30 allows cover 38 and housing 50 to be detached from body 20 to allow side panel 2 and door panel 3 to be separated.

Cover 38 is fixedly connected to housing 50 and detachably connected to body member 20. Cover 38 has a generally U-shaped cross-section and includes top portion 41 and side portions 42 interconnecting forwardly extending flange portions 39 and rearwardly extending flange portions 43. Opening 46 is disposed on top portion 41 near forwardly extending flange portions 39 to provide access to screw 27. Open slot 47 is disposed on top portion 41 near rearwardly extending flange portions 43 and engages screw 60 to connect cover 38 with housing 50. Open slot 47 and screw 60 allow the position of cover 38 to be adjusted relative to housing 50 before screw 60 is tightened to fixedly connect housing 50 and cover 38. Further, shaft 49 engages slots 44 through openings 61 of housing 50 to further secure cover 38 with housing 50. Shaft 49 slides inside slots 44 when the position of housing 50 is adjusted with respect to cover 38. Forwardly extending flange portions 39 include stub portions 40 which engage open slots 58 of housing 50. The combination of stub portions 40, open slot 58, open slot 47 and slots 44 allow the position of housing 50 to be easily adjusted with respect to cover 38 before screw 60 is fully tightened.

Each forwardly extending flange portion 39 also includes arcuate surface 48 which engages arcuate surface 35 of release 30 when release 30 is in the upright position. As noted above, hooked portions 45 of rearwardly extending flanges 43 engage stub portions 25 of body member 20. The engagement of arcuate surface 48 and arcuate surface 35 and hooked portions 45 and stub portions 25 secures cover 38 onto body 20. Cover 38 is separated from body member 20 by rotating release 30 rearwardly about the axis of shaft 26 to disengage arcuate surface 35 from arcuate surface 48 and pushing cover 38 rearwardly to disengage hooked portions 45 from stub portions 25.

Housing 50 has a generally U-shaped cross-section and includes forward housing portion 51, inclined housing portion 90 and rear housing portion 91. Housing 50 also includes rectangular opening 57 which is generally aligned with opening 46 to provide access to screw 27 and opening 56 for accepting screw 60 which engages cover 38. The offset between housing portions 51 and 91 provided by inclined housing portion 90 permits hinge 10 to be used in the inset cabinet. Although an inclined portion is used to provide an offset here, it is to be understood that a variety of arrangements, such as a portion disposed perpendicular to housing portions 51 and 91, may be used to achieve the offset arrangement.

Housing 50 also includes rearwardly extending flange portions 53, each having an opening 54, for rotatably connecting housing 50 with door panel mounting member 80 via link segments 62, 66 and 72. Link segment 62 comprises forwardly extending flange portions 61 and rearwardly extending flange portions 63 having openings 64 and 65, respectively. Openings 64 engage shaft 59 through openings 54 of flange portions 53. Openings 65 engage connector 76 through openings 86 of door panel mounting member 80. Link segment 72 is disposed inside housing 50 and comprises rounded portion 73 which forms tunnel 74 for accepting shaft 59. Link segment 72 provides a contact surface for the surface of link segment 66 as hinge 10 is rotated into the open or closed position. Link segment 66 comprises rounded portion 68 and acts as a spring to maintain hinge 10 in either the open or closed position. Link segment 66 includes rounded portions 67 forming tunnels 71 and 71A. Link segment 66 is connected to housing 50 via shaft 69 which extends through opening 55 and tunnels 71. Link segment 66 is connected to door panel mounting member 80 via connector 76 through openings 84 and tunnels 71A.

Door panel mounting member 80 includes plate portion 82 which includes openings 83 for engaging mounting screws 101 and recessed portion 81 for accepting link segments 62 and 66 when hinge 10 is in the closed position. Door panel mounting member 80 also includes openings 84 and 86 for accepting connector 76.

Figure 2:
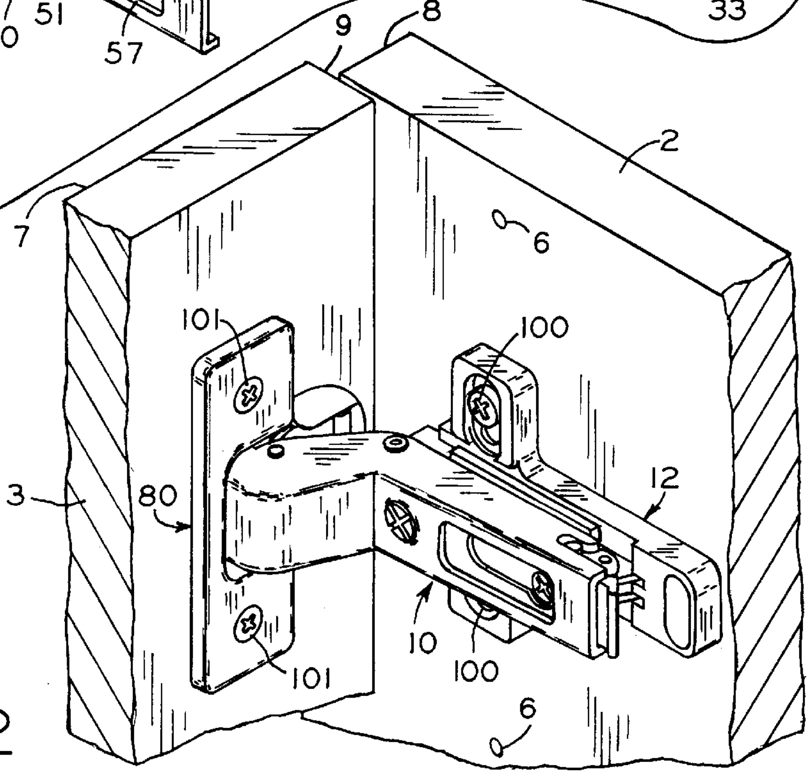
FIG. 2 is a fragmentary perspective view of a half inset cabinet showing the inset hinge attached to a door panel and a side panel.
Figure 13:
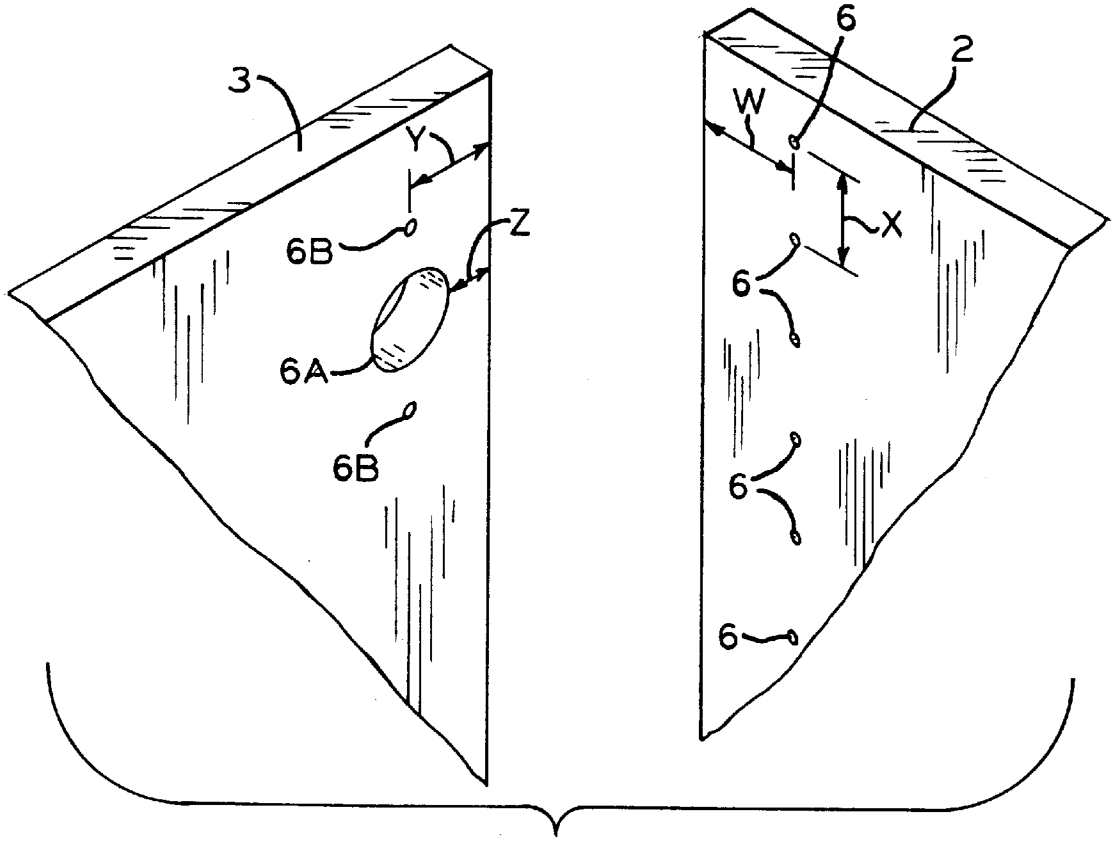
FIG. 13 is a fragmentary perspective view of the side panels and the door panels used in the present invention.
Figure 14:
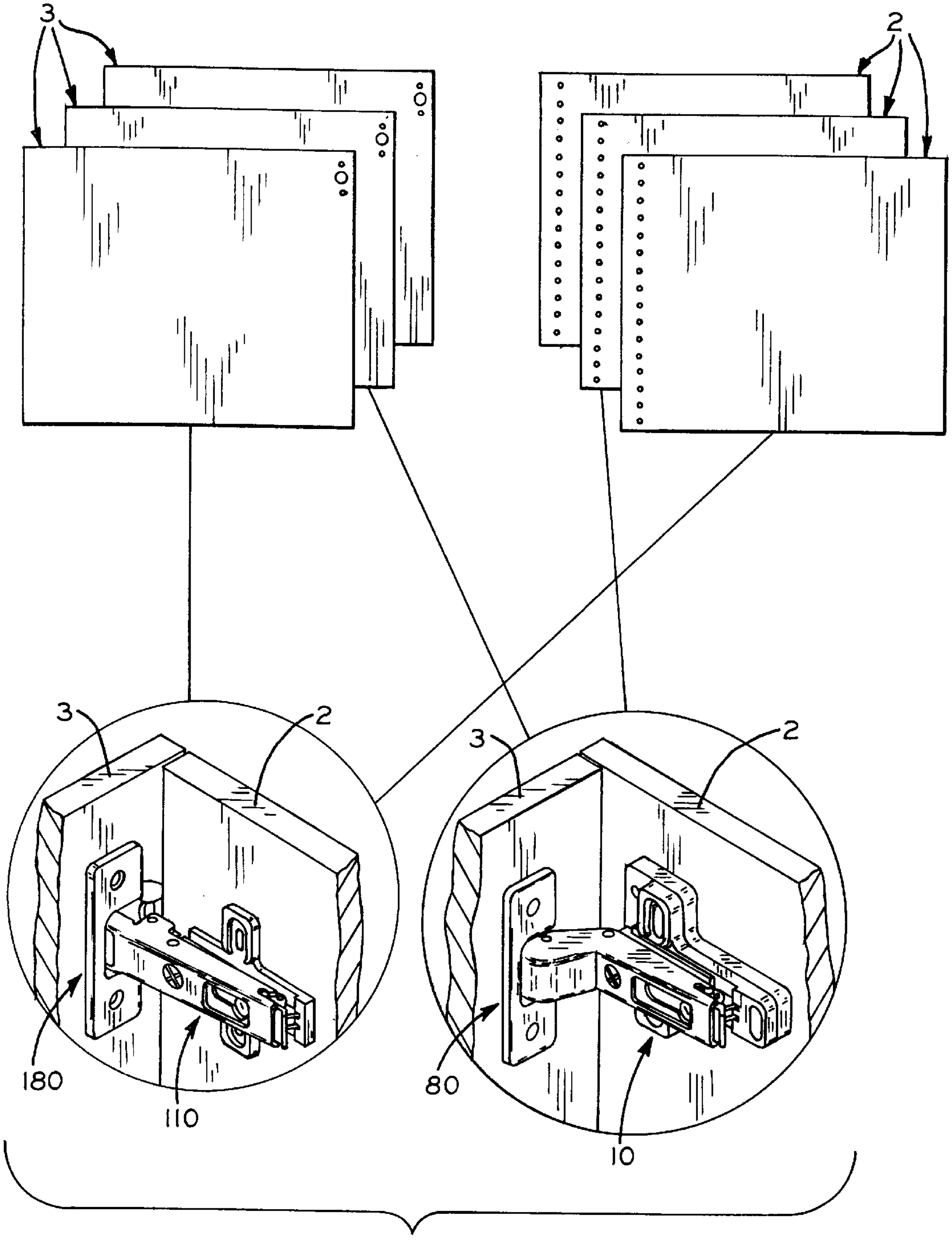
FIG. 14 is a diagrammatic view showing a plurality of cabinet side panels having identical boring, a plurality of door panels having identical boring, an overlay configuration using one each of the side and door panels connected together with a first hinge, and an inset configuration using one each of the side and door panels connected together with a second hinge.

FIG. 2 shows inset hinge 10 assembled and mounted on side panel 2 and door panel 3 using mounting screws 100 and 101 in a half inset configuration. Mounting screws 100 are threaded into bores 6 of side panel 2, and mounting screws 101 are threaded into bores 6B adjacent hinge cup 6A, as shown in FIG. 13, which accept recessed portion 81 and are formed on door panel 3. The hinge is Salice No. C2R7P99 and the mounting plate is Salice No. BASGE39/F.

Figure 3:
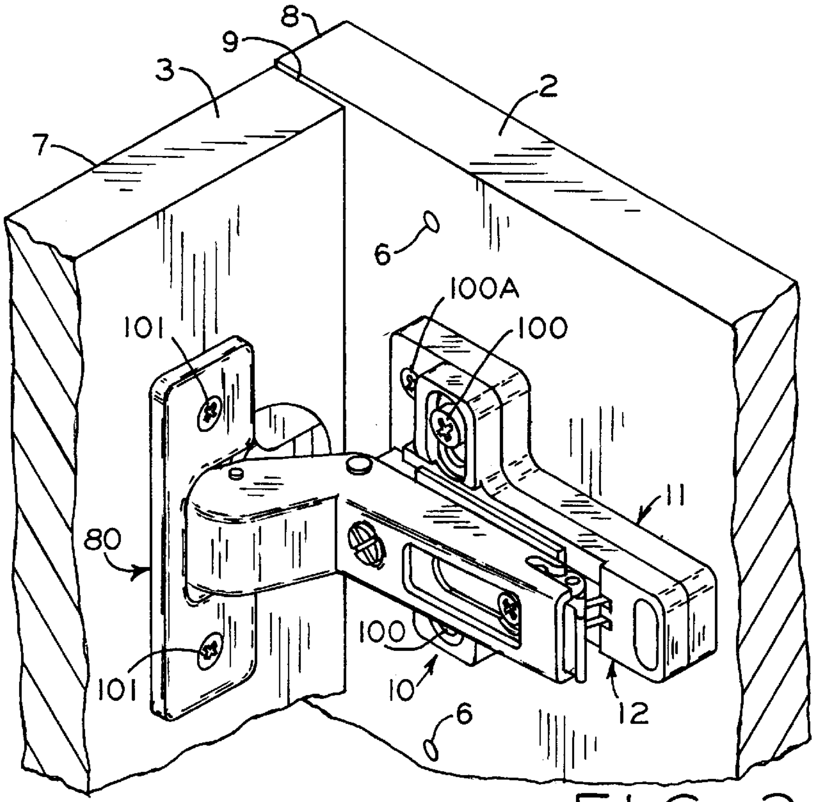
FIG. 3 is a fragmentary perspective view of a full inset cabinet showing the inset hinge attached to a side panel with a spacer.

FIG. 3 shows inset hinge 10, including 13 millimeter thick spacer 11, assembled and mounted on side panel 2 and door panel 3 in a full inset configuration. In the full inset configuration, side panel edge 8 is flush with the exterior 7 of door panel 3. Spacer 111 is fastened to panel 2 by means of screws 100A that engage holes 6 (FIG. 13), and the hinge is threadedly fastened to rear holes 11B in plate 11. The hinge is Salice No. C2R7G99 and the mounting plate is Salice No. BAVGE09/F.

The general bore configuration of the side panels and the door panels used in the present cabinet system and method for manufacturing cabinets is shown in FIG. 13. As shown in FIG. 13, each side panel 2 includes a plurality of bores 6 which are spaced a predetermined distance W, in this case 37 millimeters, from the edge of side panel 2. Each bore 6 is also spaced a predetermined distance X, in this case 32 millimeters from each other. Further, each door panel includes hinge cup 6A which has an edge distance Z spaced about 3 millimeters from the edge of door panel 3, and plurality of bores 6B spaced a predetermined distance Y, as necessary. Distance Y is preferably about 20.5 mm. The same equipment and/or automated processes may be used to produce each type of panel and an inventory of the panels thus produced and bored may advantageously be maintained at the production facility for producing either type of cabinet.

Figure 4:
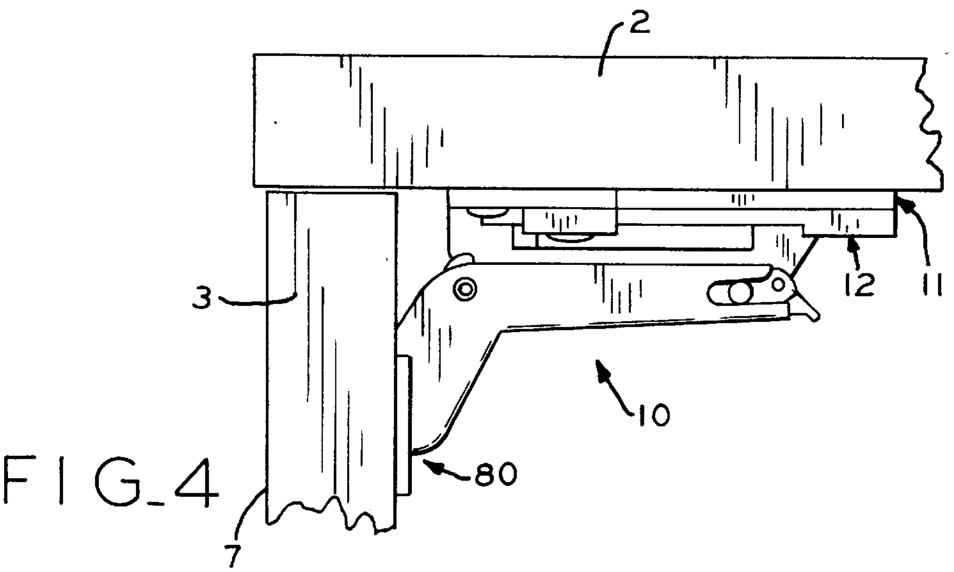
FIG. 4 is a top plan view of the full inset cabinet wherein the door panel is closed.
Figure 5:
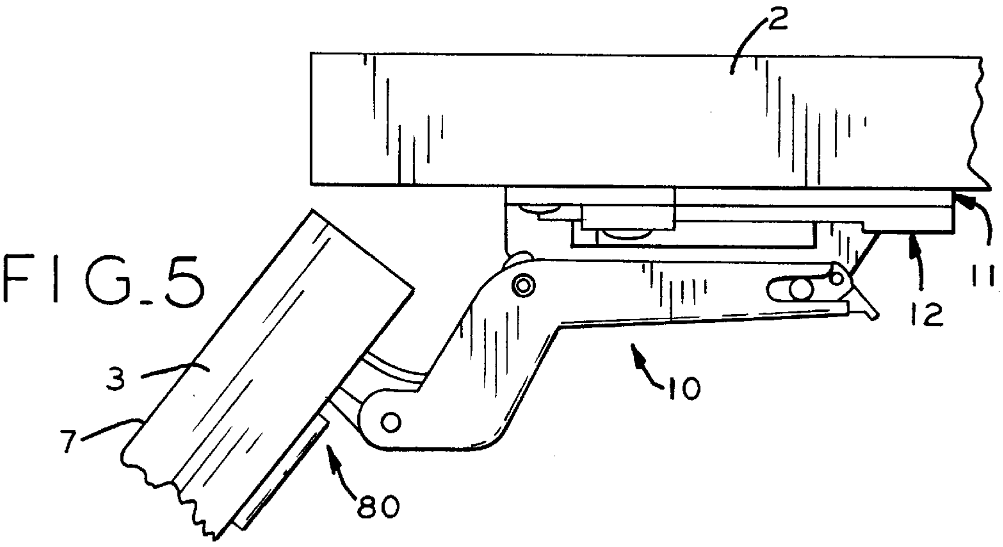
FIG. 5 is a top plan view of the full inset cabinet wherein the door panel is partially open.
Figure 6:
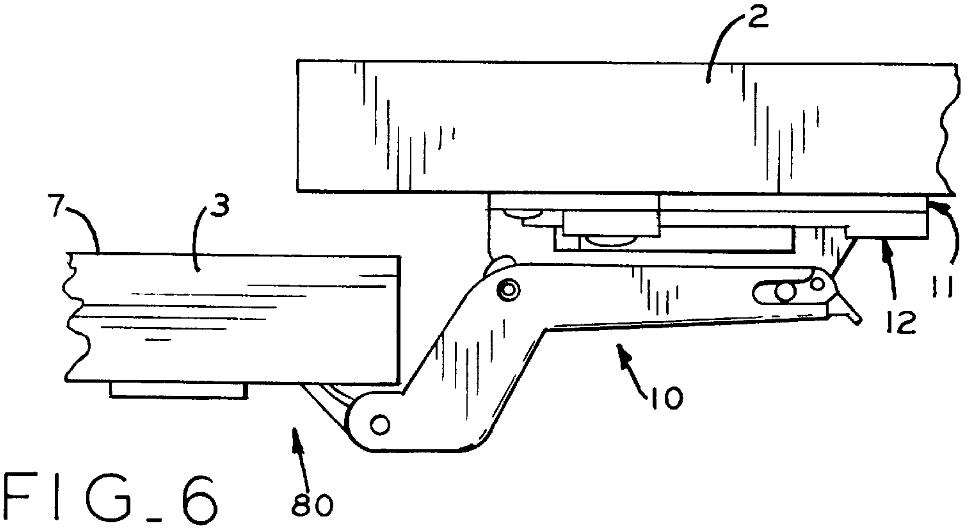
FIG. 6 is a top plan view of the full inset cabinet wherein the door panel is fully open.

The operation of inset hinge 10 connected with side panel 2 and door panel 3 in the full inset configuration is shown in FIGS. 4–6. Initially, door panel 3 rests against side panel 2 in the closed position as shown in FIG. 4. As door panel 3 opens, door end 9 swings out and away from side panel 2 until in the fully opened position, door panel 3 and side panel 2 are substantially parallel to each other.

Figure 7:
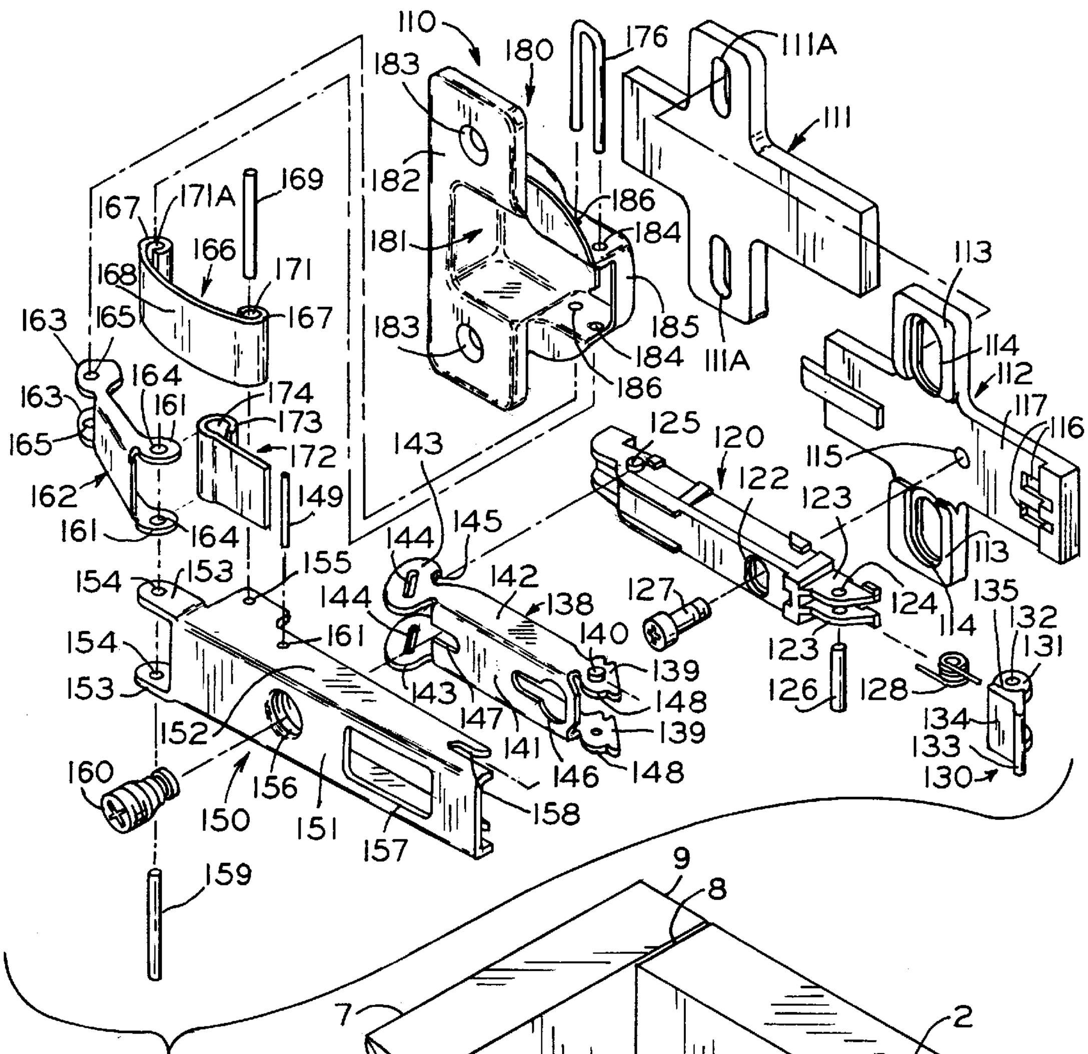
FIG. 7 is an exploded view of an overlay hinge used in the present invention.

Overlay hinge 110, which is commercially available from Salice America of Charlotte, N.C., under hinge part No. C2R7A99 and mounting plate No. BAVGE09/F is now described with reference to FIG. 7. Overlay hinge 110 comprises housing 150 connected to side panel mounting plate 112 and rotatably connected to door panel mounting member 180. Housing 150 is connected to side panel mounting plate 112 via cover 138 and body 120 which are similar in construction to cover 38 and body 20 of inset hinge 10. Housing 150 is connected to door panel mounting member 180 via link segments 162, 166 and 172 which are similar in construction to link segments 62, 66 and 72 of inset hinge 10.

Like side panel mounting plate 12, side panel mounting plate 112 is substantially T-shaped and includes fitting portion 113 having apertures 114 for accepting mounting screws 102, and grooves 116 for engaging hubs 131 of release 130. However, fitting portion 113 is disposed further from the end of elongate portion 117 than fitting portion 13 is from the end of elongate portion 17 to compensate for the different spatial relationships in the inset and overlay configurations. Optional spacer 111 including openings 111A accept mounting screw 102 is also shown.

Body 120 is attached to side panel mounting plate 112 using screw 127. Body 120 also includes stubs 125 for engaging hooked portions 145 of cover 138 and forwardly extending flange portions 123 for engaging release 130. Again, release 130 is attached to forwardly extending flange portions 123 by shaft 126 and biased into an upright position by spring 128. Release 130 also includes ridge 133 and arcuate surface 135.

Cover 138 is attached to housing 150 and detachably coupled with body member 120. Cover 138 includes flat portion 141 having opening 146 to provide access to screw 127 and open slot 147 for engaging screw 160. Cover 138 also includes forwardly extending flange portions 139 having stubs 140 which engage open slots 158 of housing 150. Cover 138 is further secured to housing 150 by shaft 149 which passes through openings 161 and slotted openings 144. Cover 138 is attached to body member 120 by engaging hooked portions 145 with stubs 125 and arcuate surface 148 with arcuate surface 135 in a manner similar to inset hinge 10. Cover 138 is detached from body member 120 in a manner similar to cover 38 and body member 20, namely by disengaging arcuate surfaces 135 and 148 and hooked portions 145 and stubs 125.

Housing 150 has a generally U-shaped cross-section and includes top portion 151 and side portions 152. Top portion 151 is generally planar and includes rectangular opening 157 which is generally aligned over opening 146 to provide access to screw 127. Top portion 151 also includes opening 156 for accepting screw 160 which engages cover 138. Screw 160 is tightly secured in open slot 147 after the position of housing 150 with respect to cover 138 has been adjusted. As noted previously, open slot portion 158 engages stubs 140 of cover 138.

Housing 150 engages door panel mounting member 180 in a manner similar to housing 50 of inset hinge 10. Link segment 162 is rotatably connected to housing 150 by shaft 159 which passes through openings 154, 164 and tunnel 174. Link segment 162 is also rotatably connected with door panel mounting member 180 by connector 176 which passes through openings 186. Further, link segment 166 which is curved and acts as a spring is connected to housing 150 by shaft 169 which passes through tunnel portion 171 and openings 155. Link segment 166 is also connected to door panel mounting member 180 by connector 176 which passes through openings 186 and tunnel 171A. Link segment 172 which provides a contact surface for link segment 166 is rotatably connected to housing 150 using shaft 159.

Figure 9:
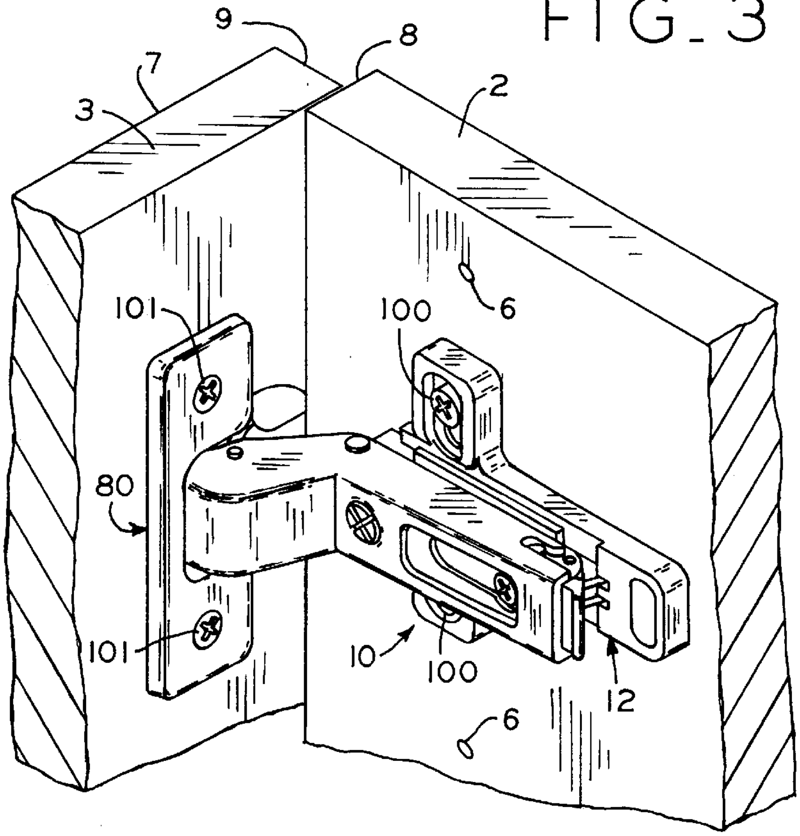
FIG. 9 is a fragmentary perspective view of a half overlay cabinet showing the overlay hinge attached to a side panel.
Figure 8:
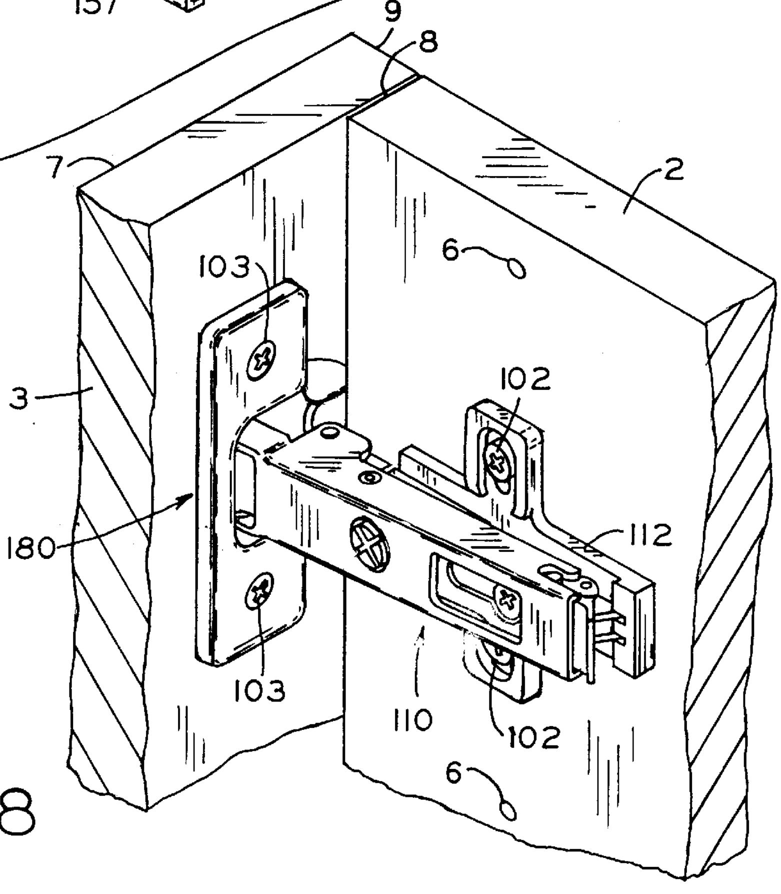
FIG. 8 is a fragmentary perspective view of a full overlay cabinet showing the overlay hinge attached to a door panel and a side panel.

FIG. 8 shows overlay hinge 110 (without spacer 111) assembled and mounted on door panel 3 and side panel 2 connected in the full overlay configuration. As discussed above, the generally straight configuration of housing 150 and the configuration of side panel mounting plate 112 permits overlay hinge 110 to be attached to door panels and side panels which are bored identically to the door panel and side panels used in the inset configuration. FIG. 9 shows overlay hinge 110 assembled and mounted on door panel 3 and side panel 2 in the half overlay configuration. The hinge is Salice part No. C2R7G99 and the mounting plate 112 is part No. BAVGE09/F.

Figure 10:
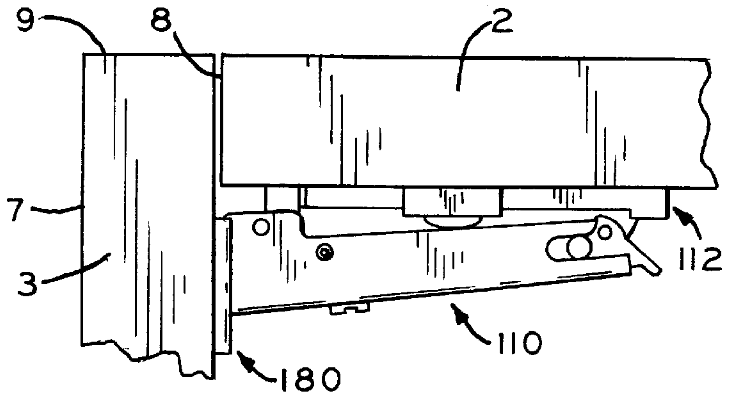
FIG. 10 is a top plan view of the full overlay cabinet wherein the door panel is closed.
Figure 11:
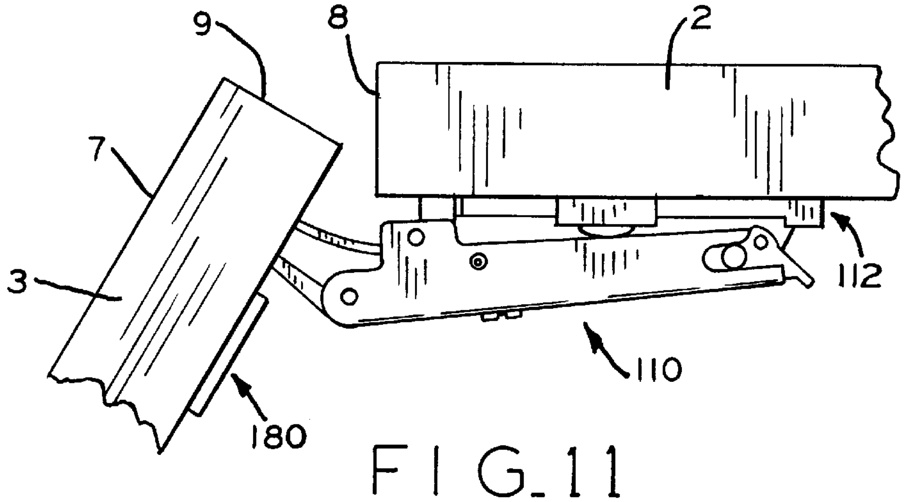
FIG. 11 is a top plan view of the full overlay cabinet wherein the door panel is partially open.
Figure 12:
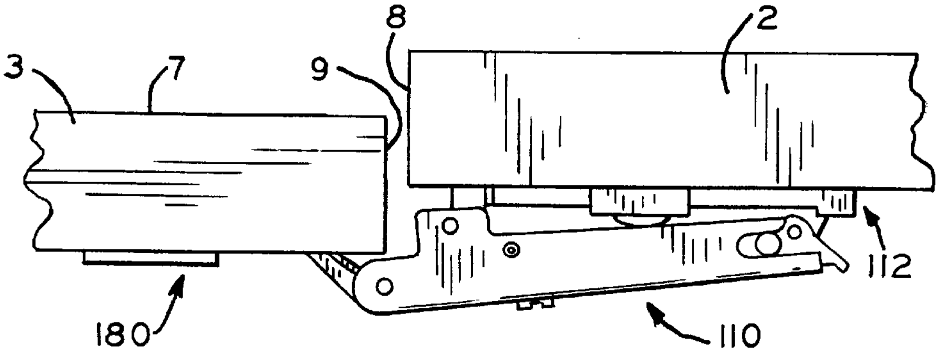
FIG. 12 is a top plan view of the full overlay cabinet wherein the door panel is fully open.

FIGS. 10–12 show the operation of overlay hinge 110 showing door panel 3, connected in the full overlay configuration, in the closed, partially open and fully opened position. As shown in FIG. 11, as door panel 3 is opened, door end 9 rotates out and away from side panel end 8, until in the fully opened position, door panel 3 and side panel 2 are substantially parallel to each other. As noted above, bores 6 of side panel 2 are disposed about 37 millimeters from the edge of side panel 2 and about 32 millimeters apart from each other. Also the edge of hinge cup 6A is disposed about 3 millimeters from the edge of side panel 3.

The method for manufacturing a plurality of inset cabinets and a plurality of overlay cabinets using the components detailed above is now described. As noted above, in a production environment, it is desirable to maintain and utilize an inventory of standardized components to thereby facilitate the manufacturing process and reduce expenses associated with using different components. The present invention provides a method for using standardized components to produce inset and overlay cabinets. The present method is particularly suitable for implementation in a large scale production environment wherein it is desired to quickly and efficiently produce large numbers of inset and/or overly cabinets and to be able to quickly switch over from producing one type of cabinet to another.

In this case, a plurality of identically bored door panels and a plurality of cabinets having identically bored side panels are provided for the manufacturing process. The identically bored door panels and identically bored side panels are prepared using conventional cabinet panel preparation methods wherein an appropriate panel material, such as wood, fiberboard, etc., are cut to the desired dimensions and a plurality of bores are drilled onto the panels for accepting fasteners associated with hinge mechanisms 10 and 110. As described above, the bores are configured on the door panels and on the side panels to accept both inset and overlay hinges.

Using the method of the present invention, an inventory of identically bored door panels 3 and cabinets having identically bored side panels 2 are used to quickly and efficiently produce a large number of inset and/or overlay cabinets. Further, an inventory of inset hinges 10 and an inventory of overlay hinges 110 is provided for ready availability and selection at the production facility. The availability of the inventory of identically bored door panels 3, identically bored cabinets, inset hinges 10 and overlay hinges 110 at the production facility, allows the manufacturer to easily select and attach the required components to quickly and efficiently to produce either an inset cabinet or an overlay cabinet. Although the method utilizes commercially available hardware (hinges and mounting plates), such door hinging hardware when used in the past according to the manufacturer's instructions for pairing of hinges and mounting plates required different side panel mounting hole patterns to be utilized for different door configurations (full overlay, inset, etc.) The inventors have recognized that by selecting and combining hinges and mounting plates from different systems, a system of door hinging hardware could be created whereby all of the hardware for the four door configurations could be utilized with a common door and side panel mounting hole pattern.

In order to produce a plurality of inset cabinets, the manufacturer first selects the appropriate number of door panels 3 from the inventory of identically bored door panels and the appropriate number of cabinets from the inventory of identically bored cabinets. Second, the manufacturer selects inset hinges 10 from the inventory of inset hinges. Third, the manufacturer selects spacer 11 if a full inset configuration is desired. The manufacturer then attaches the selected components together to produce a plurality of half or full inset cabinets. By continuously selecting door panels 3, cabinets, inset hinges 10, and spacer 11 and assembling the selected components, the manufacturer is able to quickly and efficiently produce full inset cabinets from the materials in the inventory.

When it is desired to produce a plurality of overlay cabinets, the manufacturer selects the appropriate number of door panels 3 from the inventory of identically bored door panels, the appropriate number of cabinets from the inventory of identically bored side panels, a plurality of overlay hinges 110 from the inventory of overlay hinge 110, and spacers 111 if a half overlay configuration is desired. The manufacturer then assembles the selected into components into a plurality of half or full overlay cabinets. Again, by continuously selecting door panels 3, cabinets, overlay hinges 110, and spacers 111 and assembling the selected components, the manufacturer is able to easily and efficiently produce half or full overlay cabinets from the materials in the inventory.

It can be seen that the manufacturer can switch from one type of cabinet to another by simply selecting a different hinge configuration while continuing to select the appropriate number of door panels 3 from the inventory of identically bored panels and cabinets from the inventory of cabinets. Therefore the inset and overlay cabinets can be easily and quickly assembled in large numbers. It can also be seen that a significant cost reduction is possible due to the standardization of the door and side panels thereby simplifying panel and cabinet manufacturing and reducing the associated costs.

While this invention has been described as having an exemplary design, the present invention may be further modified within the spirit and scope of this disclosure. For example, a variety of connectors, spring and link segments, and body members, as conventionally known may be used, as long as the mounting plates and mounting members as well as the housing are configured to permit the use of identically bored door panels and side panels. This application is, therefore, intended to cover any variations, uses, or adaptations of the invention using its general principles. Further, this application is intended to cover such departures from the present disclosure as come within known or customary practice in the art to which this invention pertains.

What is claimed is:

1. A method of manufacturing a plurality of inset cabinets and a plurality of overlay cabinets, comprising the steps of:

providing a plurality of identically bored door panels and a plurality of cabinets having identically bored side panels, wherein the positions and sizes of the bores in each of the plurality of door panels are identical to one another, and the positions and sizes of the bores in each of the plurality of cabinets side panels are identical to one another;

providing a plurality of first hinge mechanisms adapted to connect one of the side panels to one of the door panels to form a portion of an inset cabinet and a plurality of second hinge mechanisms adapted to connect one of the side panels to one of the door panels to form a portion of an overlay cabinet;

selecting a plurality of door panels from the plurality of identically bored door panels, a plurality of cabinets from the plurality of cabinets having identically bored side panels and a plurality of first hinge mechanisms;

attaching the selected first hinge mechanisms to the selected door panels and the side panels of the selected cabinets to form a plurality of inset cabinets;

selecting a second plurality of door panels from the plurality of identically bored door panels, a second plurality of cabinets from the plurality of cabinets having identically bored side panels and a plurality of second hinge mechanisms; and attaching the selected second hinge mechanisms to the second selected door panels and the side panels of the second selected cabinets to form a plurality of overlay cabinets.

2. The method of manufacturing a plurality of inset cabinets and a plurality of overlay cabinets in accordance with claim 1, wherein said step of providing a plurality of identically bored door panels and a plurality of cabinets having identically bored side panels comprises providing side panels having a plurality of bores spaced about 37 millimeters from an edge of the side panels.

3. The method of manufacturing a plurality of inset cabinets and a plurality of overlay cabinets in accordance with claim 2, wherein the plurality of bores are spaced about 32 millimeters apart from each other.

4. The method of manufacturing a plurality of inset cabinets and a plurality of overlay cabinets in accordance with claim 1, wherein said step of providing a plurality of identically bored door panels and a plurality of cabinets having identically bored side panels comprises providing door panels having a hinge cup for receiving a recessed portion of the first and second hinge mechanisms, said hinge cup having an edge spaced about 3 millimeters from an edge of the door panels.

5. The method of manufacturing a plurality of inset cabinets and a plurality of overlay cabinets in accordance with claim 1, wherein said step of providing a plurality of first and second hinge mechanisms comprises providing a plurality of first hinge mechanisms having a housing portion having offset first and second housing portions.

6. The method of manufacturing a plurality of inset cabinets and a plurality of overlay cabinets in accordance with claim 5, wherein said step of providing offset first and second housing portions comprises providing first and second housing portions interconnected by an inclined housing portion.

7. The method of manufacturing a plurality of inset cabinets and a plurality of overlay cabinets in accordance with claim 1, further comprising the steps of providing a plurality of inset spacers and a plurality of overlay spacers, selecting a plurality of inset spacers if a full inset configuration is desired and a plurality of overlay spacers if a half overlay configuration is desired, wherein said step of attaching the selected first hinge mechanisms comprises attaching the selected first hinge mechanisms with the inset spacers to the selected door panels and the side panels of the selected cabinets to form a plurality of full inset cabinets, said step of attaching the selected second hinge mechanisms comprises attaching the selected second hinge mechanisms with the overlay spacers to the selected door panels and the side panels of the selected cabinets to form a plurality of half overlay cabinets.

* * * * *